(12) United States Patent
Higuchi et al.

(10) Patent No.: US 6,995,196 B2
(45) Date of Patent: Feb. 7, 2006

(54) PLATEOUT-RESISTANT THERMOPLASTIC RESIN COMPOSITION

(75) Inventors: Atsuhiro Higuchi, Fukushima (JP); Hiroshi Sakabe, Kitaibaraki Ibaraki (JP)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/493,875

(22) PCT Filed: Jul. 29, 2002

(86) PCT No.: PCT/JP02/07659

§ 371 (c)(1),
(2), (4) Date: Dec. 13, 2004

(87) PCT Pub. No.: WO03/016404

PCT Pub. Date: Feb. 27, 2003

(65) Prior Publication Data

US 2005/0124729 A1  Jun. 9, 2005

(30) Foreign Application Priority Data

Aug. 10, 2001 (JP) .............................. 2001-244452

(51) Int. Cl.
*C08J 3/00* (2006.01)
*C08K 3/20* (2006.01)
*C08K 3/00* (2006.01)
*C08L 27/00* (2006.01)
*C08L 33/00* (2006.01)

(52) U.S. Cl. ...................... 523/200; 523/201; 523/205; 523/206; 523/209; 523/216; 523/335; 524/401; 524/413; 524/424; 524/430; 524/432; 524/433; 524/436; 524/437; 524/502; 524/515; 524/522; 524/527

(58) Field of Classification Search ................ 523/200, 523/201, 205, 206, 209, 216, 335; 524/401, 524/413, 424, 430, 432, 433, 436, 437, 502, 524/515, 522, 527

See application file for complete search history.

(56) References Cited

U.S. PATENT DOCUMENTS 5,939,471 A * 8/1999 Watanabe et al. ........... 523/334

FOREIGN PATENT DOCUMENTS

| EP | 712900 A2 | 5/1996 |
|---|---|---|
| JP | 5-61302 | 9/1993 |
| JP | 6-145493 | 5/1994 |
| JP | 08-081605 | 3/1996 |
| JP | 11-189675 | 7/1999 |
| WO | WO 96/34036 | 10/1996 |

* cited by examiner

Primary Examiner—Patrick D. Niland

(57) ABSTRACT

A thermoplastic resin composition, comprises a thermoplastic resin (A) and thermoplastic resin fine particles (C) carrying a colloidal inorganic substance (B), and contains the colloidal inorganic substance (B) in a proportion of 0.01–0.8 wt. % of the total of the thermoplastic resin (A), the colloidal inorganic substance (B) and the thermoplastic resin fine particles (C). The thermoplastic resin composition effectively prevents the plateout without impairing inherent properties of the base thermoplastic resin, by containing the colloidal inorganic substance (B) showing a plateout-prevention effect in a small amount and in a good dispersion state.

9 Claims, No Drawings

US 6,995,196 B2

PLATEOUT-RESISTANT THERMOPLASTIC RESIN COMPOSITION

CROSS REFERENCE TO RELATED PATENT APPLICATIONS

This non-provisional application is a national stage of International Patent Application No. PCT/JP02/007659, filed Jul. 29, 2002, benefit of which is claimed under 35 U.S.C. § 365(c) and which in turn claims benefit under 35 U.S.C. § 120 Japanese Laid-Open No. 2001-244452, filed Aug. 10, 2001, priority benefit of which is also claimed for the present national stage application.

TECHNICAL FILED

The present invention relates to a thermoplastic resin composition which is plateout-resistant, i.e., less liable to cause plateout during processing or molding thereof.

BACKGROUND ART

Thermoplastic resins are used for various processing or molding methods, such as calendering, injection molding and extrusion, for producing extensive and wide variety of shaped products because of their excellent moldability and colorability. Ordinarily, depending on a species and a usage, a thermoplastic resin may be blended with various additives, such as thermal stabilizer, antioxidant, flame-retardant, ultraviolet absorber, lubricant, plasticizer, filler, pigment, antistatic agent, impact modifier, processability modifier, and foaming agent, to form a thermoplastic resin composition, which is used for processing or molding. During the processing or molding, the thus-blended additive can be separated and precipitated to be deposited on surfaces of metallic parts of processing or molding machines, such as a calender roller, an embossing roller, a mold and an extrusion die. This phenomenon is called "plateout", and the deposited material is also called "plateout". In addition to the precipitation of such an additive, an impurity or a low-molecular weight component in the thermoplastic resin can also be precipitated and deposited to result in "plateout" in some cases. Further, "plateout" can be caused by a combination of both of these, or a combination with another factor, in some cases. Thus, in this description, a "phenomenon" of deposition of a component of a thermoplastic resin composition on a metallic part surface of a processing or molding machine, and also a "deposited material", are inclusively called "plateout".

Plateout, when caused, results in inferior products, such as a surface-roughened molded product or a molded product with inferior size accuracy. Further, it becomes necessary to terminate the operation and effect cleaning for removal of the plateout, which results in a lowering of productivity and requires a troublesome work. In many cases, plateout is obviated by selecting species and adjusting amounts of components, or adjusting the processing conditions, such as a processing temperature, etc., but the countermeasure has to be selected by trial and error because the measure can be different depending on a cause of the plateout.

In the field of processing of vinyl chloride resin, powdery silicon dioxide is known to function as an anti-plateout agent because of its large surface area effective for scraping out and absorbing a potential plateout substance, as described in "Handbook of Polyvinyl Chloride Formulating", Edited by Edward J. Wickson, John Wiley & Sons (1993), and "Plastics Additives and Modifiers Handbook", Edited by Jesse Edenbaum, Van Nostrand Reinhold (1993). While depending on the grade of silicon dioxide powder, an amount of 0.3–2% with respect to polyvinyl chloride compound is described to be effective for preventing plateout.

However, the addition in an amount as large as about 1 wt. % of silicon dioxide powder to a polyvinyl chloride compound adversely affects the impact resistance of the compound and results in a lowering in transmittance undesirably for use as a transparent product.

Further, commercially available silicon dioxide powder has a very low bulk density and is inferior in powder handling characteristic. More specifically, in the case of pneumatically transporting a resin composition containing silicon dioxide powder added to a thermoplastic resin, the fine powdery silicon dioxide is liable to go out of the system because of difficulty in capture thereof by a fine powder recovery apparatus, such as a cyclone or a bag filter. This is not only uneconomical but also undesirable as a possible source of environmental pollution.

Japanese Patent Publication (JP-B) 5-61302 has disclosed a method of providing a synthetic resin powder having improved flowability and anti-blocking property by adding fine powder of oxide of a metal, such as Si, to synthetic resin powder obtained by coagulation of a graft copolymer latex. However, the publication lacks any reference to plateout, and according to our review, such a fine powder of oxide of Si, etc., added by powder blending can only show a very low effect of plateout prevention.

Japanese Laid-Open Patent Application (JP-A) 8-81605 has disclosed to prevent plateout by adding 0.1–1 wt. part of calcium carbonate fine powder of 0.1–0.5 μm to 100 wt. parts of vinyl chloride resin. The publication describes that calcium carbonate fine powder of below 0.1 μm results in an inferior anti-plateout effect. The publication contains Examples 1 and 2 directed to compositions containing 0.1 wt. part and 1 wt. part, respectively, of calcium carbonate fine powder, and Example 2 exhibited a sufficient anti-plateout effect, whereas Example 1 exhibited a lower anti-plateout effect which is considered to be insufficient. This may be construed to be attributable to the lower addition amount of calcium carbonate fine powder. According to out knowledge, such calcium carbonate fine powder as used in the publication suffers from conspicuous dusting and is not desirable from the viewpoint of operation environment, while the publication does not refer to it. Further, in view of its Examples, the publication appears to envisage an opaque product, and a lowering in transparency appears to be inevitable when applied to a transparent product.

WO 96/34036 has disclosed an agglomerate of polymer fine particles obtained by adding a colloidal silica aqueous dispersion to an aqueous polymer latex and agglomerating the latex to provide such an agglomerate of polymer fine particles having captured therein primary particles of colloidal silica, and also a molded product having improved rigidity, toughness and thermal resistance due to the colloidal silica dispersed at a high concentration formed by molding the agglomerate. The publication describes that the colloidal silica is preferably added in an amount of 1–500 wt. parts per 100 wt. parts of the polymer and is added in a range of 25 to 150 wt. parts per 100 wt. parts of the polymer. Thus, the publication does not refer to any about a processability, particularly an anti-plateout effect, of a thermoplastic resin composition containing a lower concentration of colloidal silica as may be obtained by further blending the above-obtained agglomerate of polymer fine particles having captured colloidal silica particles with another thermoplastic resin.

DISCLOSURE OF INVENTION

A principal object of the present invention is to provide a thermoplastic resin composition having effectively suppressed plateout by containing inorganic fine particles functioning as an anti-plateout agent in an amount less than before and in a state less adversely affecting other properties, inclusive of powder handling characteristic.

As a result of our extensive study for achieving the above-mentioned object, it has been found possible to provide a thermoplastic resin composition with effective plateout-resistance without adversely affecting various properties inclusive of not only powder characteristic but also other properties, such as transparency and impact resistance, by blending inorganic fine particles functioning as an anti-plateout agent with a principal thermoplastic resin (a thermoplastic resin (A) described hereinafter) constituting the thermoplastic resin composition not directly but after causing the inorganic fine particles to be carried by separately prepared thermoplastic resin fine particles (or agglomerate thereof) having a good powder characteristic.

Thus, according to the present invention, there is provided a thermoplastic resin composition, comprising a thermoplastic resin (A) and thermoplastic resin fine particles (C) carrying a colloidal inorganic substance (B), and containing the colloidal inorganic substance (B) in a proportion of 0.01–0.8 wt. % of the total of the thermoplastic resin (A), the colloidal inorganic substance (B) and the thermoplastic resin fine particles (C).

DESCRIPTION OF THE PREFERRED EMBODIMENTS

The thermoplastic resin (A) as a principal thermoplastic resin component of the thermoplastic resin composition of the present invention may comprise any resin species not particularly restricted, but examples thereof may include: vinyl chloride resin, chlorinated vinyl chloride resin, vinylidene chloride resin, styrene resin, acrylic resin, polyester resin, polycarbonate resin, and polyamide resin. Among these, it is particularly preferred to use a vinyl chloride resin to which a stabilizer containing at least one metal element selected from the group consisting of Pb, Cd, Ca, Zn, Sn, Ba, Mg and Al has been added, since a particularly remarkable effect of plateout prevention is attained according to the present invention.

The colloidal inorganic substance (inorganic fine particles) (B) used as an anti-plateout agent in the present invention may preferably comprise at least one species of oxides or carbonates of at least one metal selected from the group consisting of Ca, Mg, Ba, Zn, Al, Si and Ti having a dispersed average particle size (primary particle size) of 2–100 nm. Among these, it is particularly preferred to use at least one species selected from oxides of Si and Ti, and carbonate of Ca. It is possible that the inorganic fine particles have been subjected to some chemical or physical surface modification. Too large a dispersed average particle size is not preferred because it provides a reduced total surface area of the inorganic particles at an identical addition amount to result in an inferior plateout prevention effect, and the resultant molded product of the thermoplastic resin composition is liable to have a rough surface state because of dispersion failure of the inorganic particles. A dispersed average particle size of 5–50 nm is particularly preferred.

As far as the colloidal inorganic substance (B) is carried by the thermoplastic resin fine particles (or agglomerate) (C) in a good dispersion of such a colloidal particle size as described above, the colloidal inorganic substance (B) can be supplied in any form not particularly restricted. In order to retain a good dispersion state in the above-mentioned colloidal particle size until the colloidal inorganic substance (B) is carried by the thermoplastic resin fine particles (or agglomerate) (C), however, it is preferred to supply the colloidal inorganic substance (B) in the form of a colloidal particle dispersion in an aqueous or organic dispersion medium. From a consideration of safety and environmental aspect, an aqueous dispersion liquid is particularly preferred.

The thermoplastic resin fine particles (or agglomerate) (C) comprise a polymer (C) which may be a polymer of at least one species of monomer selected from diene monomers, aromatic vinyl monomers, (meth)acrylate ester monomers and nitrile monomers, optionally together with another copolymerizable monomer. Examples of the polymer (C) may include: ABS resin (acrylonitrile-butadiene-styrene resin), MBS resin (methyl methacrylate-butadiene-styrene resin), AAS resin (acrylate-acrylonitrile-styrene resin), acrylic polymer impact modifiers, and polymeric processability modifiers. The polymer (C) may be added in an amount which can vary remarkably depending on the purpose of addition thereof but may generally preferably be selected from a range of 0.05–50 wt. parts, particularly 0.1–30 wt. parts, per 100 wt. parts of the thermoplastic resin (A).

The polymer (C) may be produced through a process generally used for production of synthetic resins, such as emulsion polymerization, suspension polymerization, or bulk polymerization. Among these, emulsion polymerization is preferred so as to allow the addition of the colloidal inorganic substance (B) to a latex of the polymer (C). The emulsion polymerization may be performed in the presence or absence of a known emulsifying agent.

The thermoplastic resin fine particles (or agglomerate) (C) may preferably have a particle size showing good powder processability of e.g., at least 50 μm, particularly 70–300 μm. Accordingly, fine particles of a sufficiently large size as may be produced in suspension polymerization can be used, as they are, to carry the colloidal inorganic substance (B). However, in the case of using a polymer latex capable of providing a preferable carrying state, it is preferred that the polymer latex is converted into a slurry, e.g., by coagulation, so that the polymer fine particles constituting the latex are caused to form an agglomerate thereof.

The thermoplastic resin fine particles (C) may carry the colloidal inorganic substance (B) in various modes including typically (a) a mode wherein the colloidal inorganic substance (B) is carried principally in the form of being attached onto the surface of the thermoplastic resin fine particles (or agglomerate) (C), and (b) a mode wherein the colloidal inorganic substance (B) is carried principally in the form of being included within the agglomerate of the thermoplastic resin fine particles (C). While an intermediate state is of course possible, it is preferred that the mode (b) of inclusion is predominant for the purpose of the present invention.

The above-mentioned state of carrying the colloidal inorganic substance (B) by the thermoplastic resin fine particles (or agglomerate) aimed at by the present invention may be formed in various manners, but it is at least possible to say that such a state cannot be achieved by dry blending (powder blending) of the thermoplastic resin fine particles (or agglomerate) (C) and the colloidal inorganic substance (B), and it is almost essential to adopt a wet blending mode wherein at least one of the thermoplastic resin fine particles (or agglomerate) (C) and the colloidal inorganic substance (B) is supplied in the form of a dispersion liquid thereof. If it is assumed that only one being supplied in a dispersion liquid form, it is preferred to supply the colloidal inorganic substance (B) in the form of a dispersion liquid.

More specifically, while there are various methods of forming the thermoplastic resin fine particles (or agglomerate) (C) carrying the colloidal inorganic substance (B), it is preferred to adopt a method of adding a dispersion liquid of the colloidal inorganic substance (B) to a once-dried powder of the polymer (C) and drying the mixture; a method of adding the dispersion liquid of (B) to a slurry of the polymer (C) and de-watering and drying the mixture; a, method of adding the dispersion liquid of (B) to a wet cake of the polymer (C) obtained by de-watering a slurry of the polymer (C) and then drying the mixture; a method of adding the dispersion liquid of (B) to a latex of the polymer (C) and separating and drying the solid matter of the mixture, etc. Among these, it is preferred to adopt the method of separating a solid matter from a mixture liquid of the polymer latex (C) and the colloidal inorganic substance (B). The separation of a solid matter from a mixture liquid of the polymer latex (C) and the colloidal inorganic substance (B) may be performed by any methods, inclusive of a spray drying method; a method of spraying the mixture liquid into an acidic medium to effect co-coagulation, followed by de-watering and drying; a method of co-coagulation with an acid or a salt, followed by de-watering and drying; a freeze-drying method, etc. In the course of the drying or the co-coagulation, the fine particles of the polymer (C) constituting the latex are naturally caused to form an agglomerate including the colloidal inorganic substance (B). Among the above, the method of co-coagulation followed by dewatering and drying is most preferred in order to provide a higher degree of inclusion of the colloidal inorganic substance (B).

To the polymer (C), an additive, such as a thermal stabilizer, an anti-oxidant, an ultra-violet absorber, or an anti-blocking agent, may be added as desired. These additives may be added to the latex of the polymer (C) or after the conversion thereof into a slurry or a powder.

The thermoplastic resin composition of the present invention may be obtained by blending the thermoplastic resin (A) with the thermoplastic resin fine particles (C) carrying the colloidal inorganic substance (B) so as to contain 0.01–0.8 wt. %, preferably 0.05–0.3 wt. %, of (B) with respect to the total amount of (A), (B) and (C). For the blending, a blender, such as a Henchel mixer or a Bambury mixer, may be used. At the time of blending, it is possible to add an additive, such as an impact resistance modifier, a processability modifier, the thermal stabilizer, an anti-oxidant, a flame-retardant, an ultraviolet absorber, a plasticizer, a lubricant, an anti-static agent, an anti-fungus agent, a filler, a pigment, or a foaming agent. The resultant thermoplastic resin composition may be subjected to various processing or molding processes, such as calendering, extrusion molding, blow molding, and injection molding. Thus, in the present invention, the term "plateout" not only means a narrower sense of plateout onto a calender roller surface but broadly refers to attachment of gluey substance at dies, deposition in injection molds, etc., resulting from plateout.

Hereinbelow, the present invention will be described more specifically based on Examples, which however should not be construed to restrict the scope of the present invention in any way. In the following Examples, "part(s)" means "part(s) by weight" unless otherwise noted specifically.

<Measurement Methods>

Various physical properties described herein are based on values measured according to the following methods.

Average Particle Size of Colloidal Particles

Average particle sizes of colloidal particles in aqueous dispersion liquids were measured by using an apparatus ("N4SD", made by Coulter Electronics Inc.) according to the dynamic light scattering method. Average particle size values for dry colloidal particles have been taken from a technical brochure issued by a supplier.

Dry Powder Average Particle Size and Fine Powder Fraction

A powder sample in 50 g blended with 0.5 g of carbon black was subjected to sieving on a stack of screens having openings of 850, 500, 355, 300, 250, 212, 150, 106 and 45 μm, respectively, and the weight percentages of powder fractions on the respective screens with respect to the total powder were plotted on a Rosin-Ramler digram to determine a particle size giving cumulatively 50 wt. % as an average particle size (50%-average particle size, sometimes denoted by $D_{50\%}$). Further the weight percentage of a powder fraction passing through the 45 μm-screen with respect to the total powder weight was taken as a fine powder fraction.

Plateout

A sample thermoplastic resin composition was melt-kneaded for 2 min. on test rollers each having a diameter of 150 mm and a width of 400 mm under the conditions of a roller gap of 0.25 mm, 198° C. and 13 rpm, and the gloss on the roller surfaces was evaluated by observation with eyes. The plateout level was evaluated at 5 levels ranging from a level A representing no roller surface fog due to plateout on the roller surfaces to a level E representing conspicuous fog on the roller surfaces.

Impact Strength

A resin sheet obtained after the roller kneading in the above plateout test was hot-pressed at 200° C. into a 3 mm-thick press-molded sheet, which was subjected to measurement of an impact strength at 23° C. according to JIS K7110.

Transparency

A resin sheet obtained after the roller kneading in the above plateout test was hot-pressed at 200° C. into a 3 mm-thick press-molded sheet, which was subjected to measurement of a haze value by a haze meter.

<Synthesis of Polymers (C)>

SYNTHESIS EXAMPLE A

Diene-Type Rubber-Containing Graft Polymer

Into a pressure-resistant vessel equipped with a stirrer,

| | |
|---|---|
| distilled water | 200 part(s) |
| tetra-sodium pyrophosphate | 1.5 part(s) |
| ferrous sulfate | 0.002 part(s) |
| di-sodium ethylenediaminetetraacetate | 0.005 part(s) |
| dextrose | 1 part(s) |
| potassium oleate | 1 part(s) |
| diisopropylbenzene hydroperoxide | 0.4 part(s) | were charged, and after replacement with nitrogen,

| butadiene | 75 part(s) |
| styrene | 25 part(s) |
| t-dodecylmercaptan | 0.3 part(s) | were added. The reaction was performed for 8 hours at 60° C. to obtain a diene-type rubber latex having an average particle size of 0.12 μm.

To 210 parts (including 70 parts of solid matter) of the rubber latex,

| distilled water | 60 part(s) |
| sodium formaldehydesulfoxylate | 0.6 part(s) | were added, and while the system was held at 70° C., a mixture of

| methyl methacrylate | 15 part(s) |
| cumene hydroperoxide | 0.2 part(s) | was added dropwise in 1 hour, followed by holding for 3 hours. Thereafter,

| sodium formaldehydesulfoxylate | 0.6 part(s) | was added, and while the system was held at 70° C., a mixture of

| styrene | 15 part(s) |
| cumene hydroperoxide | 0.2 part(s) | was added dropwise in 1 hour, followed by holding for 3 hours, to complete the polymerization, whereby Polymer latex (a) having an average particle size of 0.13 μm was obtained.

SYNTHESIS EXAMPLE B

Acrylic Copolymer

Into a pressure-resistant vessel equipped with a stirrer,

| distilled water | 200 part(s) |
| sodium dodecylbezenesulfonate | 2 part(s) |
| potassium persulfate | 0.1 part(s) | were charged, and after replacement with nitrogen, the system was held at 70° C. under stirring. Then, a mixture of

| methyl methacrylate | 60 part(s) |
| n-butyl methacrylate | 40 part(s) | was added dropwise in hours, followed by holding for 2 hours to complete the polymerization, whereby Polymer latex (b) was obtained.

[Synthesis Example c] Acrylic Rubber-Containing Graft Copolymer

Into a pressure-resistant vessel equipped with a stirrer,

| distilled water | 200 part(s) |
| boric acid | 0.45 part(s) |
| anhydrous sodium carbonate | 0.045 part(s) |
| potassium oleate | 2 part(s) |
| potassium persulfate | 0.15 part(s) | were charged, and after replacement with nitrogen, the system was held at 70° C. under stirring. Then, a mixture of

| n-butyl acrylate | 49.8 part(s) |
| divinylbenzene | 0.2 part(s) | was added dropwise in 3 hours, and the system was further held for 1 hour. Thereafter,

| potassium persulfate | 0.15 part | was added, and while the system was held at 70° C., a mixture of

| n-butyl acrylate | 49 part(s) |
| alkyl acrylate | 1 part(s) | was added dropwise in 3 hours, followed by holding for 1 hour, to obtain an acrylic rubber latex having an average particle size of 0.24 μm.

To 210 parts (including 70 parts of solid matter) of the rubber latex,

| distilled water | 60 part(s) |
| potassium persulfate | 0.15 part(s) | were added, and while the system was hold at 70° C., a mixture of

| methyl methacrylate | 25 part(s) |
| styrene | 5 part(s) | was added dropwise in 2 hours, followed by holding for 2 hours to complete the polymerization, whereby Polymer latex (c) was obtained.

EXAMPLE 1

Polymer latex (a) containing 100 parts of solid matter and 2.5 parts (solid matter=1 part) of a colloidal silica aqueous dispersion liquid ("SNOWTEX ST-XL", made by Nissan Kagaku Kogyo K.K.) containing colloidal silica (as colloidal inorganic substance) having an average particle size of 50 nm were mixed with each other. The mixture exhibited an average particle size of 0.13 μm which was not larger than that in Polymer latex (a). To the mixture, 0.5 part of butylated hydroxytoluene was added, and the resultant mixture was added gradually to 1000 parts of a 0.5 wt. %-aqueous sulfuric acid solution (coagulant) held at 40° C. under stirring. Then, the mixture was neutralized with a 10 wt. %-potassium hydroxide aqueous solution, and after being heat-treated at an increased temperature of 90° C., the mixture was de-watered and dried to obtain an inorganic substance-containing polymer powder (of $D_{50\%}$=ca. 150 μm). Incidentally, the filtrated liquid during the de-watering was clear. As a result of observation of a cross-section of the inorganic substance-carrying polymer powder, the inorganic particles were taken inside the polymer and in a form of being substantially included therein. The inorganic substance-carrying polymer powder exhibited a fine powder fraction of 4.5 wt. % and was found to be a powder causing little dusting.

A vinyl chloride resin ("S9008", made by Kureha Chemical Industry Co., Ltd.) was blended with 15 parts of the above-prepared inorganic substance-carrying polymer powder, 2.5 parts of Ca—Zn-based stabilizer ("Irgastab CZ122", made by Witco Co.), 0.25 part of stearic acid, 0.3 part of aliphatic amide wax ("Henkel Loxiol EBS", made by Henkel Co.), 2.5 parts of epoxidized soybean oil and 2.0 parts of an acrylic polymer processability modifier by means of a Henchel mixer, to prepare a thermoplastic resin composition.

The thermoplastic resin composition was subjected to evaluation of Plateout, Impact Strength and Transparency (Haze) according to the above-described methods. The results of the evaluation are shown in Table 1 appearing hereinafter together with those of thermoplastic resin compositions prepared in the following Examples.

EXAMPLE 2

A thermoplastic resin composition was prepared in the same manner as in Example 1 except for using an inorganic substance-carrying polymer powder, which was prepared in a similar manner as in Example 1 except that Polymer latex (a) without being mixed with colloidal silica was converted into a polymer slurry, and the polymer slurry was blended with 1 part (as solid matter) of the colloidal silica aqueous dispersion liquid having an average particle size of 50 nm ("SNOWTEX ST-XL", made by Nissan Kagaku Kogyo K.K.), followed by dewatering and drying.

EXAMPLE 3

A thermoplastic resin composition was prepared in the same manner as in Example 1 except for using an inorganic substance-carrying polymer powder, which was prepared in a similar manner as in Example 1 except that Polymer latex (a) without being mixed with colloidal silica was dried as it was into a polymer powder, and the polymer powder ($D_{50\%}$=ca. 150 μm) was blended with 1 part (as solid matter) of the colloidal silica aqueous dispersion liquid having an average particle size of 50 nm ("SNOWTEX ST-XL", made by Nissan Kagaku Kogyo K.K.), followed by further drying.

EXAMPLE 4

A thermoplastic resin composition was prepared in the same manner as in Example 1 except for using an inorganic substance-carrying polymer powder, which was prepared in a similar manner as in Example 1 except that Polymer latex (a) was blended with 0.2 part (0.08 part as solid matter) of a colloidal silica aqueous dispersion liquid having a solid matter content of 40 wt. % and an average particle size of 15 nm instead of 1 part (as solid matter) of the colloidal silica aqueous dispersion liquid having an average particle size of 50 nm ("SNOWTEX ST-XL", made by Nissan Kagaku Kogyo K.K.).

COMPARATIVE EXAMPLE 1

A thermoplastic resin composition was prepared in the same manner as in Example 1 except for using instead of the inorganic substance-carrying polymer powder a dry polymer powder, which was prepared by treating Polymer latex (a) similarly as in Example 1 except for omitting the colloidal silica aqueous dispersion liquid.

COMPARATIVE EXAMPLE 2

A thermoplastic resin composition was prepared in the same manner as in Example 1 except for using instead of the inorganic substance-carrying polymer powder a dry polymer-inorganic substance powder mixture, which was prepared in a similar manner as the inorganic substance-caring polymer powder in Example 1 except that Polymer latex (a) without being colloidal silica was dried as it was into a polymer powder, and the polymer powder was blended with 1 part (solid matter) of fine powdery silica having an average primary particle size of 30 nm ("AEROSIL 50", made by Nippon Aerosil K.K.).

COMPARATIVE EXAMPLES 3 and 4

A thermoplastic resin composition was prepared in the same manner as in Example 1 except for using instead of the inorganic substance-carrying polymer powder two types of inorganic substance-carrying polymer powders, which were prepared in a similar manner as the inorganic substance-carrying polymer powder in Example 1 except for changing the amount of the colloidal silica aqueous dispersion liquid ("SNOWTEX ST-XL", made by Nissan Kagaku Kogyo K.K.) to 10 parts and 0.01 part, respectively as solid matter as shown in Table 1, instead of 1 part (in Example 1).

EXAMPLE 5

A thermoplastic resin composition was prepared in a similar manner as in Example 1 except for adding instead of 15 parts of the inorganic substance-carrying polymer powder 2 parts of an inorganic substance-carrying polymer powder which was prepared in a similar manner as in Example 1 except for using Polymer latex (b) instead of Polymer latex (a), changing the amount of the colloidal silica aqueous dispersion liquid to 5 parts (as solid matter), and changing the coagulant to a 1 wt. % aluminum sulfate aqueous solution without neutralization, and adding 20 parts of an impact strength modifier for vinyl chloride resin ("BTA 712", made by Kureha Chemical Co., Ltd.) instead of the 2 parts of an acrylic polymer processability modifier, respectively, per 100 parts of the vinyl chloride resin, as shown in Table 1.

EXAMPLE 6

A thermoplastic resin composition was prepared in the same manner as in Example 1 except for using an inorganic substance-carrying polymer powder, which was prepared in a similar manner as in Example 1 except for using Polymer latex (c) instead of Polymer latex (a).

The thermoplastic resin composition was evaluated in the same manner as in Example 1, but the measurement of a haze values was not measured since the molded product was apparently opaque.

As shown in Table 1, Examples 1–4 are directed to examples of the thermoplastic resin composition according to the present invention containing inorganic substance-carrying polymers formed by adding colloidal inorganic substance and exhibited clearly less plateout compared with the thermoplastic resin composition of Comparative Example 1 obtained without adding an inorganic substance. The thermoplastic resin compositions of Examples 1–4 caused little dusting and were free from lowering in other physical properties.

The thermoplastic resin composition of Comparative Example 2 obtained by powder blending of fine powdery silica with a polymer (C) after drying, was not only inferior in plateout resistance but also somewhat inferior in dusting resistance, transparency and impact strength.

The thermoplastic resin composition of Comparative Example 3 obtained by adding an excessively large amount of colloidal silica aqueous dispersion liquid, was poor in handling characteristic because of the occurrence of much dust in addition to a difficulty that a substantial proportion of colloidal inorganic substance was not sufficiently coagulated but discharged out of the system.

The thermoplastic resin composition of Comparative Example 4 exhibited little improvement in plateout resistance because of a small amount of addition of the colloidal silica aqueous dispersion liquid.

The thermoplastic resin composition of Example 5 obtained by adding a polymer processability modifier as a polymer (C), exhibited an excellent plateout resistance, maintained a transparency and did not obstruct the strength-improving effect owing to the addition of an impact strength modifier ("BTA 712").

The thermoplastic resin composition of Example 6 obtained by using an acrylic impact-resistance modifier as a polymer (C), similarly exhibited a good plateout resistance while not obstructing the improvement in impact strength.

TABLE 1

| | Example | | | | | | | | | |
|---|---|---|---|---|---|---|---|---|---|---|
| | 1 | 2 | 3 | 4 | Comp. 1 | Comp. 2 | Comp. 3 | Comp. 4 | 5 | 6 |
| Polymer (C) latex | (a) | (a) | (a) | (a) | (a) | (a) | (a) | (a) | (b) | (c) |
| Inorganic substance (B) | | | | | | | | | | |
| Type *1 | $SiO_2(C)$ | $SiO_2(C)$ | $SiO_2(C)$ | $SiO_2(C)$ | — | $SiO_2(P)$ | $SiO_2(C)$ | $SiO_2(C)$ | $SiO_2(C)$ | $SiO_2(C)$ |
| Average particle size [nm] *2 | 50 | 50 | 50 | 15 | — | 30 | 50 | 50 | 50 | 50 |
| Amount (solid) [wt. parts] | 1 | 1 | 1 | 0.08 | — | 1 | 10 | 0.01 | 5 | 1 |
| State of polymer (C) at the time of adding (B) | latex | slurry | powder | latex | — | powder | latex | latex | latex | latex |
| State of filtrate liquid | clear | clear | — | clear | clear | — | turbid | clear | clear | clear |
| Fine powder fraction [wt. %] | 4.5 | 4.8 | 4.9 | 3.8 | 3.8 | 5.3 | 8.4 | 4.4 | 5.1 | 4.2 |
| Dusting | little | little | little | little | little | noticeable | severe | little | little | little |
| Amount of (B) + (C) [wt. parts] | 15 | 15 | 15 | 15 | 15 | 15 | 15 | 15 | 2 | 15 |
| Amount of BTA 712 [wt. parts] | — | — | — | — | — | — | — | — | 20 | — |
| Amount of K-130P [wt. parts] | 2 | 2 | 2 | 2 | 2 | 2 | 2 | 2 | — | 2 |
| (B)/(A) + (B) + (C) [wt. %] | 0.13 | 0.13 | 0.13 | 0.010 | 0 | 0.13 | 1.3 | 0.0013 | 0.078 | 0.13 |
| Plateout | A | A | B | B | E | D | A | E | A | A |
| Haze [%] | 3.6 | 3.5 | 3.9 | 3.2 | 3.2 | 6.5 | 17.8 | 3.4 | 3.2 | — |
| Impact strength [kJ/m$^2$] | 124 | 126 | 122 | 130 | 130 | 109 | 32 | 124 | 132 | 126 |

*1 $SiO_2(C)$ represents colloidal silica added as an aqueous dispersion liquid, and $SiO_2(P)$ represents colloidal silica added as dry fine powder.
*2 The average particle size of $SiO_2(P)$ is a primary particle size value shown in a technical brochure from the supplier.

INDUSTRIAL APPLICABILITY

As described above, according to the present invention, there is provided a thermoplastic resin composition, which contains a colloidal inorganic substance showing a plateout-prevention effect in a small amount and in a good dispersion state, and as a result thereof, effectively prevents the plateout without impairing inherent properties of the base thermoplastic resin.

What is claimed is:

1. A thermoplastic resin composition, comprising a thermoplastic resin (A) and thermoplastic resin fine particles (C) carrying a colloidal inorgarnic substance (B), and containing the colloidal inorganic substance (B) in a proportion of 0.01–0.8 wt. % of the total of the thermoplastic resin (A), the colloidal inorganic substance (B) and the thermoplastic resin fine particles (C).

2. A thermoplastic resin composition according to claim 1, wherein the thermoplastic resin fine particles (C) assumes an agglomerate structure.

3. A thermoplastic resin composition according to claim 2, wherein the colloidal inorganic substance (B) is carried principally in the form of being attached onto a surface of the thermoplastic resin fine particle agglomerate (C).

4. A thermoplastic resin compostion according to claim 3, wherein the thermoplastic resin fine particle agglomerate (C) carrying the colloidal inorganic substance (B) has been obtained by mixing a slurry comprising a coagulated latex of polymer forming the thermoplastic resin fine particle agglomerated (C) with the colloidal inorganic substance (B), and then drying the mixture.

5. A thermoplastic resin composition according to claim 2, wherein the colloidal inorganic substance (B) is carried principally in the form of being included within the thermoplastic resin fine particle agglomerate (C).

6. A thermoplastic resin composition according to claim 5, wherein the thermoplastic resin fine particle agglomerate (C) carrying the colloidal inorganic substance (B) has been obtained by mixing a latex of polymer forming the thermoplastic resin fine particle agglomerate (C) with the colloidal inorganic substance (B), and then subjecting the mixture to coagulation of the polymer latex and drying.

7. A thermoplastic resin composition according to claim 6, wherein the colloidal inorganic substance (B) mixed with the polymer latex is in the form of a colloidal dispersion liquid.

8. A thermoplastic resin composition according to claim 1, wherein
   (a) the colloidal inorganic substance (B) comprises at least one of oxides and carbonates of at least one metal selected from the group consisting of Ca, Mg, Ba, Zn, Al, Si and Ti in the form of fine particles having an average particle size of 2–100 nm, and
   (b) the thermoplastic resin fine particles (C) comprise fine particles of polymer of at least one species of monomer selected from the group consisting of diene monomers, aromatic vinyl monomers, (meth)acrylate monomers and nitrile monomers, and are contained in a proportion of 0.05–50 wt. parts per 100 wt. parts of the thermoplastic resin (A).

9. A thermoplastic resin composition according to claim 1, wherein the thermoplastic resin (A) is a vinyl chloride resin, and the thermoplastic resin composition further contains a stabilizer comprising at least one metal selected from the group consisting of Pb, Cd, Ca, Zn, Sn, Ba, Mg, and Al.

* * * * *